(12) United States Patent
Kitayama et al.

(10) Patent No.: US 10,371,115 B2
(45) Date of Patent: Aug. 6, 2019

(54) CONTROL DEVICE FOR INTERNAL COMBUSTION ENGINE

(71) Applicant: TOYOTA JIDOSHA KABUSHIKI KAISHA, Toyota-shi (JP)

(72) Inventors: Takeshi Kitayama, Susono (JP); Yoshiyuki Yamashita, Susono (JP); Yoshihiro Furuya, Toyota (JP); Hiroki Murata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 325 days.

(21) Appl. No.: 15/173,240

(22) Filed: Jun. 3, 2016

(65) Prior Publication Data

US 2016/0356257 A1 Dec. 8, 2016

(30) Foreign Application Priority Data

Jun. 5, 2015 (JP) ................................. 2015-114740

(51) Int. Cl.
*F02P 5/15* (2006.01)
*F01P 7/04* (2006.01)
(Continued)

(52) U.S. Cl.
CPC ............... *F02P 5/1502* (2013.01); *F01P 7/04* (2013.01); *F01P 7/167* (2013.01); *F02D 41/06* (2013.01);
(Continued)

(58) Field of Classification Search
CPC ....... Y02T 10/46; F02D 35/027; F02D 37/02; F02D 2200/1015; F02P 17/12;
(Continued)

(56) References Cited

U.S. PATENT DOCUMENTS 4,782,795 A * 11/1988 Kubozuka ............. F01P 3/2285
123/406.35
6,736,113 B1 * 5/2004 Ott .......................... F02P 11/06
123/198 F (Continued)

FOREIGN PATENT DOCUMENTS

CN 103282617 A 9/2013
EP 1 403 480 A2 3/2004
(Continued)

*Primary Examiner* — Sizo B Vilakazi
(74) *Attorney, Agent, or Firm* — Oblon, McClelland, Maier & Neustadt, L.L.P.

(57) ABSTRACT

A control device for an internal combustion engine includes a knock control system, a cooling system, and an electronic control unit. The knock control system is configured to ignite a spark plug an ignition crank angle obtained by retarding the ignition crank angle in response to an occurrence of the knocking. The electronic control unit is configured to supply a command value corresponding to a target value of a cooling parameter to the cooling system such that the cooling system performs cooling of the internal combustion engine according to the command value. The electronic control unit is configured to correct the command value based on a KCS learned value such that as the KCS learned value increases, a correction amount for correcting the command value increases in correction amount in a direction in which a cooling capacity of the cooling system increases.

11 Claims, 10 Drawing Sheets

(51) Int. Cl.
  *F01P 7/16* (2006.01)
  *F02P 5/152* (2006.01)
  *F02P 17/12* (2006.01)
  *F02D 41/06* (2006.01)
  *F01P 3/02* (2006.01)
  *F01P 5/10* (2006.01)
  *F01P 5/12* (2006.01)

(52) U.S. Cl.
  CPC ............... *F02P 5/152* (2013.01); *F02P 17/12* (2013.01); *F01P 7/165* (2013.01); *F01P 2003/027* (2013.01); *F01P 2005/105* (2013.01); *F01P 2005/125* (2013.01); *F01P 2037/00* (2013.01); *F02P 5/1523* (2013.01); *F02P 2017/128* (2013.01)

(58) Field of Classification Search
  CPC .... F02P 5/1502; F02P 5/152; F02P 2017/128; F01P 7/04; F01P 7/167; F01P 2037/00; F01P 2005/125; F01P 2003/027; F01P 2005/105; F01P 7/165
  See application file for complete search history.

(56) References Cited

U.S. PATENT DOCUMENTS

| | | |
|---|---|---|
| 2004/0055283 A1 | 3/2004 | Iihoshi et al. |
| 2004/0182360 A1 | 9/2004 | Mashiki |
| 2009/0088957 A1 | 4/2009 | Yamada et al. |
| 2009/0120410 A1* | 5/2009 | Kaneko ................... F02P 5/152 123/406.38 |
| 2010/0107995 A1 | 5/2010 | Kamiyama et al. |
| 2013/0247847 A1 | 9/2013 | Nogawa et al. |

FOREIGN PATENT DOCUMENTS

| | | |
|---|---|---|
| EP | 1 403 480 A3 | 3/2004 |
| EP | 1 460 265 A1 | 9/2004 |
| EP | 2 140 122 B1 | 7/2011 |
| JP | 63-97823 A | 4/1988 |
| JP | 2001-304028 A | 10/2001 |
| JP | 2003-239747 A | 8/2003 |
| JP | 2004-143969 A | 5/2004 |
| JP | 2004-278461 A | 10/2004 |
| JP | 2008-215173 A | 9/2008 |
| JP | 2013-133747 A | 7/2013 |

* cited by examiner

RETARD DIRECTION

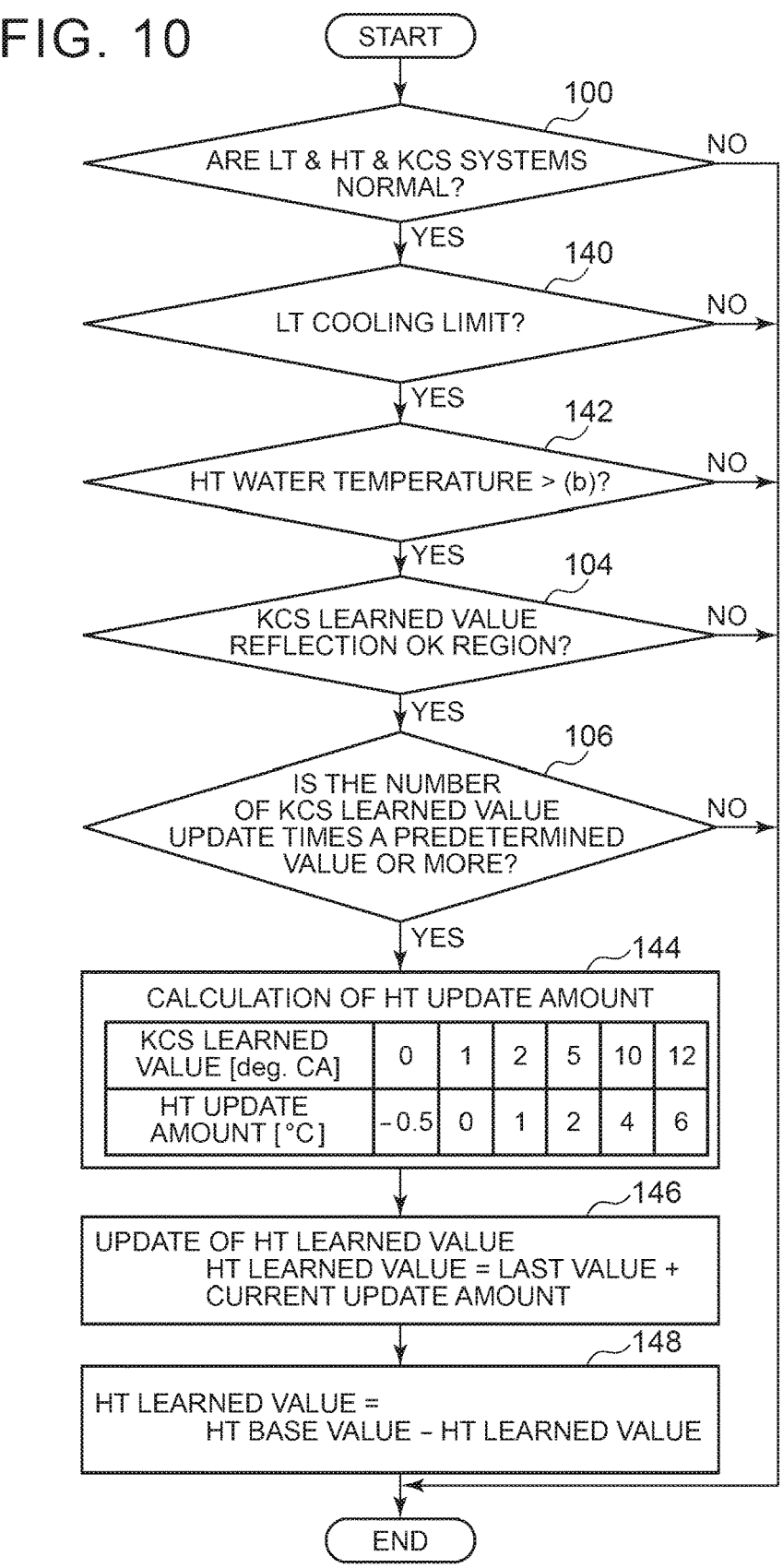

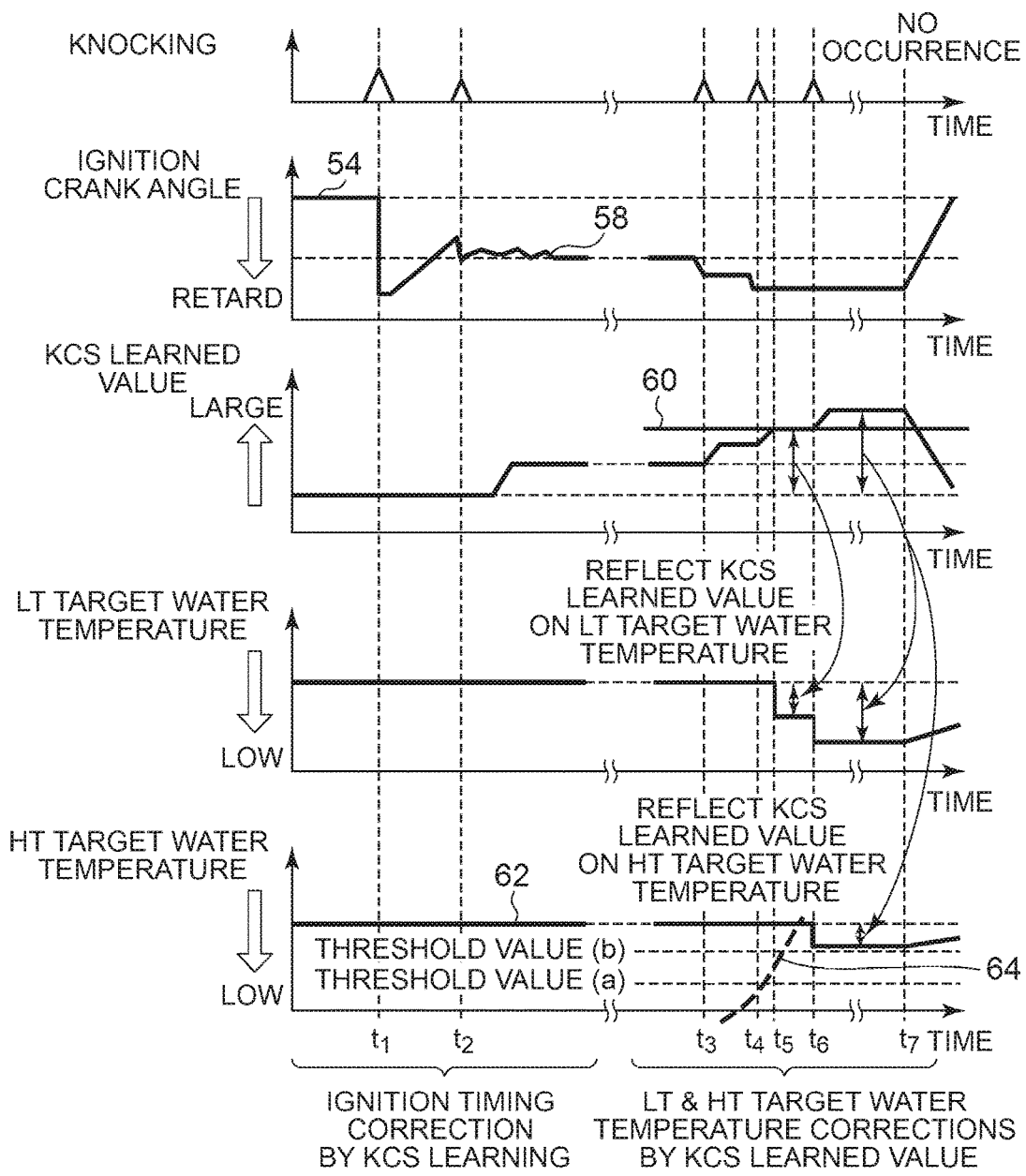

CONTROL DEVICE FOR INTERNAL COMBUSTION ENGINE

INCORPORATION BY REFERENCE

The disclosure of Japanese Patent Application No. 2015-114740 filed on Jun. 5, 2015 including the specification, drawings and abstract is incorporated herein by reference in its entirety.

BACKGROUND OF THE DISCLOSURE

1. Field of the Disclosure

The disclosure relates to a control device for an internal combustion engine and, in particular, relates to a control device suitable for controlling an internal combustion engine mounted on a vehicle.

2. Description of Related Art

Japanese Patent Application Publication No. 2001-304028 (JP 2001-304028 A) discloses an internal combustion engine having both a function of retarding an ignition crank angle according to the knock intensity and a function of decreasing a target value of cooling water temperature according to the knock intensity. It is known that, in an internal combustion engine, as the ignition crank angle is more retarded, knocking is more difficult to occur while fuel consumption is deteriorated. It is also known that as the cooling water temperature decreases, the in-cylinder temperature decreases so that knocking is more difficult to occur.

When knocking has occurred in the above-mentioned conventional internal combustion engine, a state in which knocking is difficult to occur is created by both the retard of the ignition crank angle and the decrease in the cooling water temperature. In this case, compared to a case where knocking is prevented relying only on the retard of the ignition crank angle, it is possible to suppress the retard amount of the ignition crank angle necessary for such knocking prevention. Therefore, according to the above-mentioned conventional internal combustion engine, the occurrence of knocking can be properly prevented without excessively retarding the ignition crank angle and thus without largely deteriorating the fuel consumption.

BRIEF SUMMARY

In an internal combustion engine, the ignition crank angle can be immediately changed by changing a command angle. Therefore, if the ignition crank angle is retarded according to the knock intensity, the environment of the internal combustion engine is immediately changed to a state suitable for elimination of knocking in terms of the ignition crank angle.

On the other hand, the cooling water temperature reaches a target value with a certain delay after changing to such a target value. Therefore, in the case where the target value of cooling water temperature is decreased according to the knock intensity, some time is required thereafter for the environment of the internal combustion engine to reach a state suitable for elimination of knocking in terms of the cooling water temperature.

In this regard, there is still room for improvement in the above-mentioned conventional internal combustion engine with respect to a demand for realizing an environment optimal for elimination of knocking in terms of both the ignition crank angle and the cooling water temperature.

The disclosure provides a control device for an internal combustion engine that can efficiently prevent the occurrence of knocking by properly controlling both the ignition crank angle and the cooling water temperature.

A control device for an internal combustion engine according to one aspect of the disclosure includes a knock control system, a cooling system, and an electronic control unit. The knock control system is configured to calculate a KCS learned value according to the presence or absence of knocking of the internal combustion engine such that the KCS learned value is updated in an increase direction when the knocking occurs and is updated in a decrease direction when the knocking does not occur. The knock control system is configured to calculate an ignition crank angle based on the KCS learned value. The knock control system is configured to ignite a spark plug of the internal combustion engine at an ignition crank angle obtained by retarding the ignition crank angle in response to an occurrence of the knocking. The cooling system is configured to cool the internal combustion engine. The electronic control unit is configured to supply a command value corresponding to a target value of a cooling parameter to the cooling system such that the cooling system performs cooling of the internal combustion engine according to the command value. The electronic control unit is configured to correct the command value based on the KCS learned value such that as the KCS learned value increases, a correction amount for correcting the command value increases in correction amount in a direction in which a cooling capacity of the cooling system increases.

According to the control device for an internal combustion engine according to this aspect, the ignition crank angle is calculated based on the KCS learned value and, further, is retarded in response to an occurrence of knocking. Therefore, after the occurrence of knocking, the internal combustion engine is immediately changed to a state suitable for prevention of knocking in terms of the ignition crank angle. Further, the command value for the cooling system is corrected based on the KCS learned value. Since the KCS learned value is updated according to the presence or absence of knocking, the tendency of the occurrence of knocking is reflected thereon. Therefore, by correcting the command value of the cooling capacity of the cooling system according to the KCS learned value, the command value can be made suitable for prevention of knocking before knocking occurs, and further can be made to follow the change of the tendency of the occurrence of knocking. Therefore, the occurrence of knocking can be efficiently prevented by both the ignition crank angle and the temperature environment.

In the control device for an internal combustion engine according to the above-mentioned aspect, the electronic control unit may be configured not to correct the command value when the number of times of updating the KCS learned value according to the presence or absence of the knocking is less than a predetermined value, and is configured to correct the command value when the number of times of such updating is the predetermined value or more.

According to the control device for an internal combustion engine according to this aspect, the correction of the command value for the cooling system can be carried out only in the state where the update of the KCS learned value is sufficiently performed. By repeating the update, the KCS learned value becomes a value corresponding to the tendency of the occurrence of knocking. Therefore, it can be effectively prevented that improper correction is carried out in the stage where the tendency of the occurrence of knocking is not properly reflected on the KCS learned value.

In the control device for an internal combustion engine according to the above-mentioned aspect, the electronic control unit may be configured to update a cooling parameter learned value based on the KCS learned value such that as the KCS learned value increases, an update amount for updating the cooling parameter learned value increases in update amount in a direction in which the cooling capacity of the cooling system increases. The electronic control unit may be configured to determine the target value based on a base value of the cooling parameter and the cooling parameter learned value.

According to the control device for an internal combustion engine according to this aspect, the target value of the cooling parameter is determined based on the base value of the cooling parameter and the cooling parameter learned value. Further, as the KCS learned value increases, the cooling parameter learned value is largely updated in the direction in which the cooling capacity increases. Therefore, when it can be determined that the occurrence of knocking is more likely with a greater KCS learned value, the temperature state of the internal combustion engine can be made to largely approach a state suitable for prevention of knocking by largely increasing the cooling capacity.

In the control device for an internal combustion engine according to the above-mentioned aspect, the electronic control unit may be configured to calculate the update amount of the cooling parameter learned value based on the KCS learned value and to update the cooling parameter learned value with the update amount such that as the KCS learned value increases, the update amount increases in update amount in the direction in which the cooling capacity of the cooling system increases.

According to the control device for an internal combustion engine according to this aspect, the cooling parameter learned value is updated with the update amount calculated based on the KCS learned value. Since, as the KCS learned value increases, the update amount is largely updated in the direction in which the cooling capacity increases, the cooling parameter learned value can be properly updated based on the KCS learned value.

In the control device for an internal combustion engine according to the above-mentioned aspect, the knock control system may be configured to calculate the KCS learned value for each of a plurality of operating regions of the internal combustion engine. The electronic control unit may be configured to store an update rule for each of the operating regions for updating the cooling parameter learned value for each of the operating regions based on the KCS learned value for each of the operating regions. The electronic control unit may be configured to update the cooling parameter learned value in every individual operating region according to the update rule for each of the operating regions.

According to the control device for an internal combustion engine according to this aspect, the cooling parameter learned value in every individual operating region is updated according to the KCS learned value calculated per operating region and the update rule stored per operating region. Therefore, the target value of the cooling parameter is also calculated per operating region. The tendency of the occurrence of knocking may differ depending on the operating regions. By using the target value calculated per operating region, the cooling system can be properly controlled to a state suitable for the tendency of the occurrence of knocking in every individual operating region.

In the control device for an internal combustion engine according to the above-mentioned aspect, the cooling parameter may be a cooling medium temperature. The electronic control unit may be configured to supply as the command value a target value of the cooling medium temperature to the cooling system such that as the KCS learned value increases, a correction amount of the target value of the cooling medium temperature increases in a low-temperature direction. The cooling system may be configured to control a cooling medium of the cooling system so as to realize the target value of the cooling medium temperature.

According to the control device for an internal combustion engine according to this aspect, the target value of the cooling medium temperature is supplied as the command value to the cooling system. In the cooling system, the cooling medium is controlled so as to realize the target value. As the KCS learned value increases, the target value is largely corrected in the low-temperature direction. Therefore, as the occurrence of knocking becomes more likely, the temperature environment of the internal combustion engine can be shifted in a direction suitable for prevention of knocking.

In the control device for an internal combustion engine according to the above-mentioned aspect, the cooling system may include an electric water pump capable of changing a discharge amount of a cooling medium. The cooling parameter may be the discharge amount of the electric water pump. The electronic control unit may be configured to supply as the command value a target value of the discharge amount to the cooling system such that as the KCS learned value increases, a correction amount of the target value of the discharge amount increases in an amount increase direction.

According to the control device for an internal combustion engine according to this aspect, the target value of the discharge amount of the cooling medium is supplied as the command value to the cooling system. In the cooling system, the electric water pump is controlled so as to realize the target value. As the KCS learned value increases, the target value is largely corrected in the amount increase direction. When the target value of the discharge amount increases, the cooling capacity of the cooling system is improved. Therefore, as the occurrence of knocking becomes more likely, the temperature environment of the internal combustion engine can be shifted in a direction suitable for prevention of knocking.

In the control device for an internal combustion engine according to the above-mentioned aspect, the internal combustion engine may include a first cooling system that mainly cools a cylinder block of the internal combustion engine and a second cooling system that mainly cools the periphery of an intake port compared to the first cooling system. The first cooling system and the second cooling system respectively may include cooling medium flow passages independent of each other. The electronic control unit may be configured to supply the command value to the second cooling system.

According to the control device for an internal combustion engine according to this aspect, the internal combustion engine is cooled by the first cooling system that mainly cools the cylinder block and by the second cooling system that mainly cools the periphery of the intake port compared to the first cooling system. The second cooling system is separated from the first cooling system and, in response to the command value from the electronic control unit, exhibits higher cooling capacity as the occurrence of knocking becomes more likely. For prevention of knocking, it is effective to decrease the temperature of the periphery of the intake port. On the other hand, a decrease in the temperature of the cylinder block causes an increase in mechanical friction and cooling loss and thus causes the deterioration of the fuel consumption. According to this aspect, it is possible to properly cool only the periphery of the intake port according to the tendency of the occurrence of knocking without largely decreasing the temperature of the cylinder block. Therefore, the occurrence of knocking can be properly prevented without deteriorating the fuel consumption.

In the control device for an internal combustion engine according to the above-mentioned aspect, the electronic control unit may be configured to supply a target temperature to the first cooling system. The first cooling system may be configured to control a cooling medium of the first cooling system so as to realize the target temperature of the first cooling system. The electronic control unit may be configured to decrease the target temperature of the first cooling system when the second cooling system has reached a limit of cooling.

According to the control device for an internal combustion engine according to this aspect, when coming into a state where the temperature environment of the internal combustion engine cannot be shifted in a direction more suitable for prevention of knocking by the second cooling system, the target temperature of the first cooling system can be decreased. When the temperature of the first cooling system decreases, the temperature environment of the internal combustion engine is shifted in a direction advantageous for prevention of knocking. Therefore, the operating conditions that can prevent knocking can be further broadened.

In the control device for an internal combustion engine according to the above-mentioned aspect, the electronic control unit may be configured to allow a decrease in the target temperature of the first cooling system only when a cooling medium temperature of the first cooling system is higher than a determination temperature.

According to the control device for an internal combustion engine according to this aspect, it is possible to prevent the cooling medium temperature of the first cooling system from decreasing to the determination temperature or less. When the temperature of the first cooling system excessively decreases, the fuel consumption of the internal combustion engine is largely deteriorated. By keeping the temperature of the first cooling system not lower than the determination temperature, the operating conditions that can prevent knocking can be widely ensured.

In the control device for an internal combustion engine according to the above-mentioned aspect, the electronic control unit may be configured to decrease the target temperature of the first cooling system based on the KCS learned value.

According to the control device for an internal combustion engine according to this aspect, the target temperature of the first cooling system can be decreased corresponding to the tendency of the occurrence of knocking. Therefore, both the first cooling system and the second cooling system can be properly controlled at temperatures suitable for prevention of knocking.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a flowchart of a routine implemented by an ECU in the fourth embodiment of the disclosure; and FIG. 11 is a timing chart showing one example of the operation of the fourth embodiment of the disclosure.

DETAILED DESCRIPTION OF EMBODIMENTS

Figure 1:
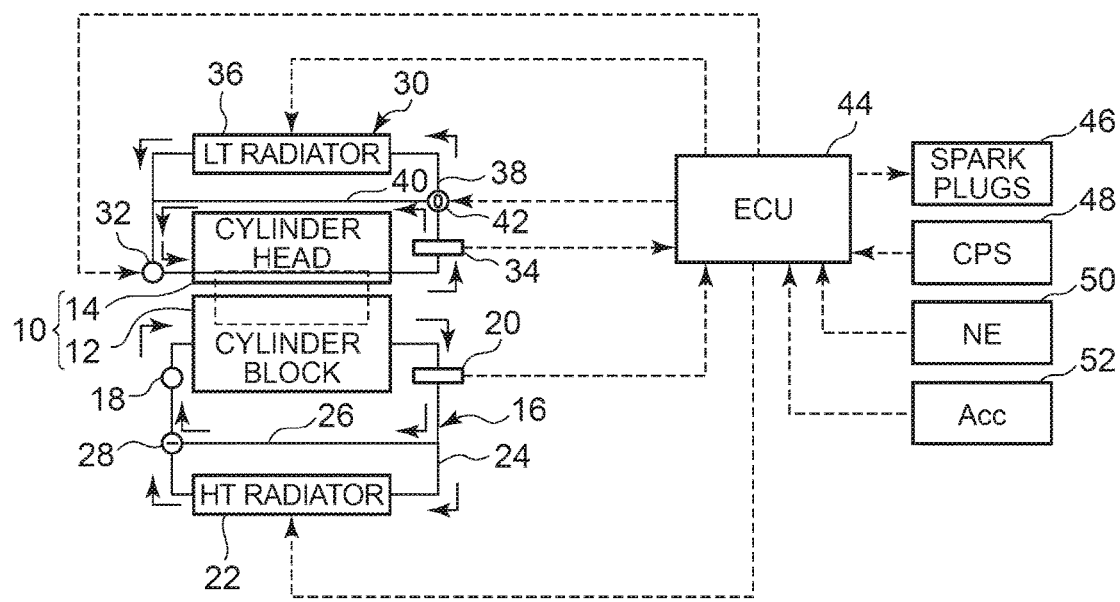
FIG. 1 is a diagram showing the configuration of a first embodiment of the disclosure.

FIG. 1 is a diagram showing the configuration of a first embodiment of the disclosure. As shown in FIG. 1, a system of this embodiment includes an internal combustion engine 10. The internal combustion engine 10 is an engine that is used while mounted on a vehicle, and includes a cylinder block 12 and a cylinder head 14. Cooling water passages independent of each other are respectively formed in the cylinder block 12 and the cylinder head 14.

The cooling water passage of the cylinder block 12 constitutes part of a HT (High Temperature) system 16 configured to mainly cool the cylinder block 12. The HT system 16 includes a water pump (W/P) 18 on the inlet side of the cylinder block 12. The W/P 18 is mechanically driven by the internal combustion engine 10 so as to be able to discharge cooling water in the HT system 16 toward the cylinder block 12.

A HT water temperature sensor 20 is provided on the outlet side of the cylinder block 12. The HT water temperature sensor 20 produces an ethwH signal corresponding to a temperature of the cooling water flowing in the HT system 16.

The HT system 16 includes a circulation passage 24 provided with a HT radiator and a bypass passage 26 bypassing the HT radiator 22. The HT radiator 22 can cool the cooling water flowing therein by the vehicle traveling wind. The HT radiator 22 is provided with a cooling fan (not shown) and, as needed, can cool the cooling water also by the air introduced by the cooling fan.

The bypass passage 26 has one end connected to the circulation passage 24 via a thermostat (T/S) 28. The T/S 28 is a three-way valve configured to change a flow passage according to a temperature of the cooling water. Specifically, while the temperature of the cooling water is low, the T/S 28 operates to close a passage leading from the HT radiator 22 toward the W/P 18, thereby circulating the cooling water exclusively through the bypass passage 26, and as the temperature of the cooling water rises, the T/S 28 operates to increase the ratio of the cooling water that flows through the HT radiator 22.

On the other hand, the cooling water passage of the cylinder head 14 constitutes part of a LT (Low Temperature) system 30. Compared to the HT system 16, the LT system 30 is a cooling system configured to mainly cool the peripheries of intake ports. The LT system 30 includes an electric water pump (E-W/P) 32 on the inlet side of the cylinder head 14. The E-W/P 32 operates with a duty cycle corresponding to a Duty signal supplied from the outside so as to be able to discharge cooling water toward the cylinder head 14 with a discharge capacity corresponding to the Duty signal.

A LT water temperature sensor 34 is provided on the outlet side of the cylinder head 14. The LT water temperature sensor 34 produces an ethwL signal corresponding to a temperature of the cooling water flowing in the LT system 30.

The LT system 30 includes a circulation passage 38 provided with a LT radiator 36 and a bypass passage 40 bypassing the LT radiator 36. Like the HT radiator 22, the LT radiator 36 can cool the cooling water by the vehicle traveling wind or by the cooling air produced by a built-in cooling fan (not shown).

The bypass passage 40 has one end connected to the circulation passage 38 via a three-way valve 42. In response to an opening degree signal supplied from the outside, the three-way valve 42 can change the ratio between the cooling water that flows through the bypass passage 40 and the cooling water that flows through the LT radiator 36.

The system shown in FIG. 1 includes an electronic control unit (ECU) 44. The ECU 44 can detect a cooling water temperature of the HT system 16 (hereinafter referred to as a "HT water temperature") and a cooling water temperature of the LT system 30 (hereinafter referred to as a "LT water temperature") based on an ethwH signal of the HT water temperature sensor 20 and an ethwL signal of the LT water temperature sensor 34. Further, the ECU 44 can control the states of the cooling fan of the HT radiator 22 and the cooling fan of the LT radiator 36. In addition, the ECU 44 can also control the states of the E-W/P 32 and the three-way valve 42 of the LT system 30.

The ECU 44 is electrically connected also to various sensors and actuators provided in the internal combustion engine 10. For example, the ECU 44 can command an ignition timing for each of spark plugs 46 attached to respective cylinders of the internal combustion engine 10. Further, the ECU 44 can detect an in-cylinder pressure of each cylinder based on an output of an in-cylinder pressure sensor (CPS) 48 disposed per cylinder. In addition, the ECU 44 can detect an engine rotational speed (NE) based on an output of an NE sensor 50 and can detect an accelerator opening degree (Acc) based on an output of an accelerator opening degree sensor 52.

Figure 2:
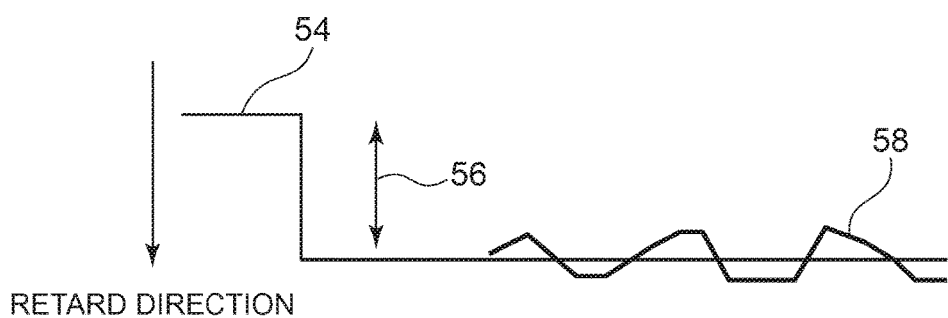
FIG. 2 is a timing chart for explaining the operation of a knock control system in the first embodiment of the disclosure.

The system of this embodiment is equipped with a knock control system (KCS). FIG. 2 is a diagram for explaining the operation of the KCS. In FIG. 2, the ordinate axis represents the ignition crank angle (downward is a retard direction) of the specific cylinder of the internal combustion engine 10, while the abscissa axis represents the lapse of time.

In the internal combustion engine 10, when the ignition crank angle continues to be advanced, knocking occurs shortly. Hereinafter, a crank angle at which knocking occurs in the advance process will be referred to as a "trace knock point (TK point)." In the internal combustion engine 10, as long as knocking does not occur, the fuel consumption characteristics are improved as the ignition crank angle is more advanced. Therefore, it is preferable that the ignition crank angle of each cylinder be controlled around the TK point in such a way as to prevent the occurrence of knocking.

A crank angle denoted by symbol 54 in FIG. 2 is a base value 54 of an ignition crank angle that is set according to the operating conditions of the internal combustion engine 10. The base value 54 is a crank angle set in advance as a standard TK point.

An arrow denoted by symbol 56 in FIG. 2 represents a KCS learned value. The KCS learned value 56 is updated in an increase direction (e.g. by α) in response to an occurrence of knocking, whereas the KCS learned value 56 is updated in a decrease direction (e.g. by α) in the state where knocking is not occurring. Therefore, the KCS learned value becomes a large value in an environment where knocking tends to occur, whereas the KCS learned value becomes a small value in an environment where knocking is difficult to occur.

The system of this embodiment performs a feedback control of the ignition crank angle such that a TK point is traced using as a central value a value obtained by adding the KCS learned value 56 to the base value 54. Specifically, in addition to the base value 54 and the KCS learned value 56, the ECU 44 calculates a feedback correction value for the ignition crank angle. This feedback correction value is updated in a retard direction largely (e.g. by β) in response to an occurrence of knocking and is updated in an advance direction (e.g. by γ sufficiently smaller than β) while knocking does not occur. The update amounts β and γ of the feedback correction value are each sufficiently greater than the update amount α of the KCS learned value.

A waveform denoted by symbol 58 in FIG. 2 represents a final ignition crank angle obtained by adding the feedback correction value. The ECU 44 requires ignition at the final ignition crank angle 58 for the spark plug 46. With this configuration, in the internal combustion engine 10, it is possible to achieve the ignition crank angle optimal for both the knocking and the fuel consumption.

As described above, the internal combustion engine 10 of this embodiment includes the HT system 16 configured to mainly cool the cylinder block 12. The HT system 16 circulates the cooling water through the bypass passage 26 when the HT water temperature is low such as immediately after the start of the internal combustion engine 10. In this case, since the heat radiation amount is small, the HT water temperature increases rapidly. The temperature of the cylinder block 12 largely affects the mechanical friction and the cooling loss of the internal combustion engine 10. If it is possible to raise the HT water temperature early, the adverse effects caused by them can be reduced early so that the fuel consumption characteristics immediately after the engine start-up can be enhanced.

As warming-up of the internal combustion engine 10 progresses so that the HT water temperature reaches a set temperature (e.g. 85° C. to 90° C.) of the T/S 28, the bypass passage 26 is closed so that the cooling water starts to circulate through the HT radiator 22. When the cooling water starts to flow through the HT radiator 22, the heat radiation amount increases to prevent an increase in the HT water temperature. Therefore, the HT water temperature is controlled around the set temperature by the function of the T/S 28.

The ECU 44 can detect a HT water temperature based on an ethwH signal of the HT water temperature sensor 20. When the HT water temperature is higher than the set temperature of the T/S 28 or when the HT water temperature is required to be lower than the set temperature of the T/S 28, the ECU 44 issues a drive command to the fan of the HT radiator 22. The cooling capacity of the HT radiator 22 is improved jointly with the operation of the fan. Therefore, according to this embodiment, the HT water temperature can be controlled at a target water temperature equal to or around the set temperature of the T/S 28. Hereinafter, a control target of the HT water temperature will be referred to as a "HT target water temperature."

The internal combustion engine 10 includes the LT system 30 configured to circulate the cooling water through the inside of the cylinder head 14. According to the LT system 30, the peripheries of the intake ports can be efficiently cooled without largely decreasing the temperature of the cylinder block 12. As described above, the temperature of the cylinder block 12 largely affects the loss of the internal combustion engine 10. On the other hand, the temperature around the intake ports largely affects the temperature of intake air and thus largely affects the tendency of the occurrence of knocking. Therefore, according to the LT system 30, it is possible to create a temperature environment suitable for prevention of knocking without increasing the loss due to mechanical friction and so on.

In this embodiment, by changing the state of the three-way valve 42, the LT system 30 can change the ratio between the amount of the cooling water that flows through the bypass passage 40 and the amount of the cooling water that flows through the LT radiator 36. Further, by changing the duty cycle of a Duty signal supplied to the E-W/P 32, it is possible to change the amount of the cooling water that circulates in the LT system 30. In addition, the heat radiation capacity can be changed by controlling the operation of the fan incorporated in the LT radiator 36. By performing a feedback control of them based on an ethwL signal of the LT water temperature sensor 34, the ECU 44 can control the LT water temperature at an arbitrary target water temperature (hereinafter referred to as a "LT target water temperature") that is independent of the HT target water temperature.

Figure 3:
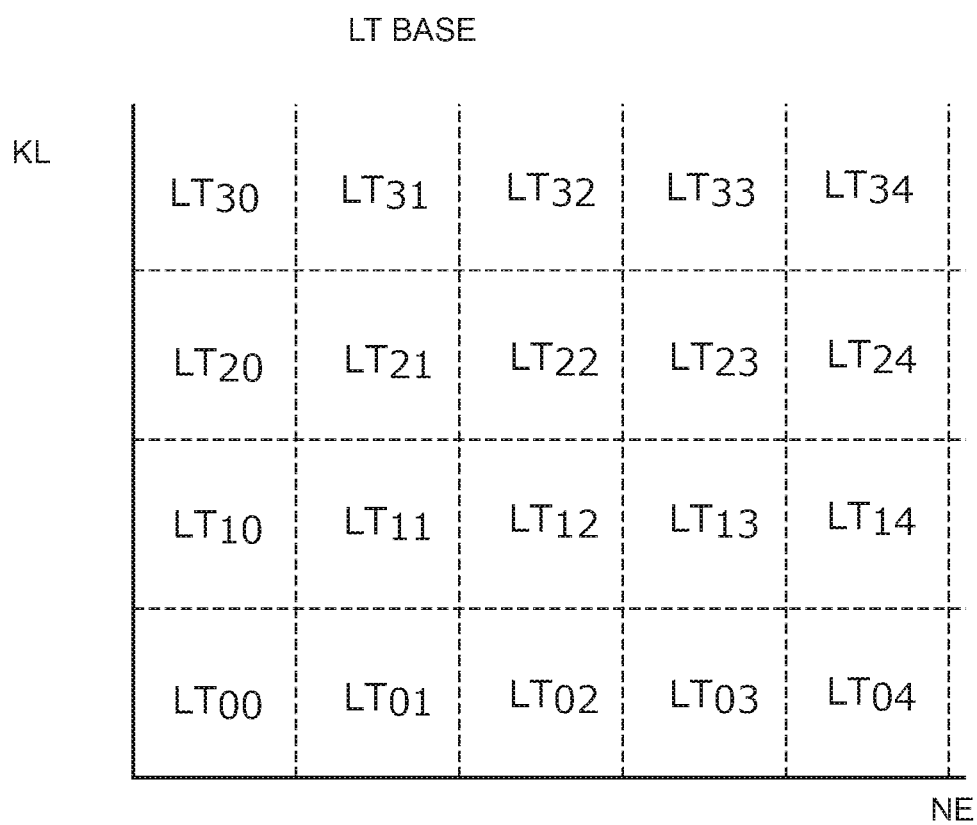
FIG. 3 is a diagram for explaining a map of base water temperatures of a low temperature (LT) system of the first embodiment of the disclosure.

FIG. 3 shows a map of LT base values stored in the ECU 44 for determining a LT target water temperature. In the map shown in FIG. 3, the LT base values are each determined based on the relationship between an engine rotational speed NE and an engine load KL. The ECU 44 determines a LT target water temperature based on the LT base value specified from this map. The ECU 44 calculates an engine load KL (specifically a charging efficiency) based on an accelerator opening degree Acc by a known method.

The tendency of the occurrence of knocking changes depending on the engine operating conditions. For example, a low-speed high-load region is a region where knocking tends to occur. The map shown in FIG. 3 is determined such that the LT base value decreases in a region where the occurrence of knocking is more likely. As a result, the LT target water temperature is set to a low temperature in a region where knocking tends to occur.

As the LT target water temperature decreases, the LT water temperature decreases so that knocking is more difficult to occur. That is, in an operating region that tends to cause the occurrence of knocking, the internal combustion engine 10 of this embodiment creates a temperature environment that makes the occurrence of knocking difficult. Therefore, in the internal combustion engine 10 of this embodiment, the occurrence of knocking can be efficiently prevented over the entire operating region without relying on a large retard of the ignition crank angle.

As described above, the internal combustion engine 10 of this embodiment is configured to prevent the occurrence of knocking by controlling the ignition crank angle by the KCS. In addition, the internal combustion engine 10 is configured to reflect an operating region of the internal combustion engine 10, i.e., an engine rotational speed NE and an engine load KL, on a LT target water temperature, thereby preventing the occurrence of knocking also from the aspect of temperature environment.

If an attempt is made to prevent the occurrence of knocking relying only on the function of the KCS, a large ignition retard is required in an operating region where knocking tends to occur so that the fuel consumption characteristics of the internal combustion engine 10 tend to be deteriorated. In contrast, if the temperature environment about knocking is improved in such an operating region, the ignition retard amount can be suppressed to avoid the deterioration of the fuel consumption. In this regard, setting a LT target water temperature using the map shown in FIG. 3 is effective in terms of improving the fuel consumption.

However, the tendency of the occurrence of knocking is not uniformly determined for an operating region of the internal combustion engine 10. Therefore, if a LT target water temperature is set in consideration of only the operating region, there is a possibility of a situation where the tendency of the occurrence of knocking is not sufficiently eliminated so that it is not possible to prevent the production of an excessive retard amount.

The situation described above can be avoided by, for example, reflecting a knocking occurrence state on a LT target water temperature. That is, by decreasing the LT target water temperature in the state where knocking is frequently occurring and by increasing the LT target water temperature in the state where knocking is not occurring, it is possible to prevent the production of an excessive retard amount.

As a method of reflecting a knocking occurrence state on a LT target water temperature, the following methods, for example, are considered: (1) Uniformly decreasing the LT target water temperature at the time of the occurrence of knocking; or (2) Decreasing the LT target water temperature by a width corresponding to a knock intensity at the time of the occurrence of knocking.

According to the method 1 or 2, when knocking still occurs in the state where the ignition crank angle is controlled by the KCS, the temperature environment of the internal combustion engine 10 can be changed in a direction in which knocking is difficult to occur, by decreasing the temperature of the LT system 30. Further, according to the method 2, the temperature environment can be largely changed as knocking intensifies. According to these methods, since the tendency of the occurrence of knocking can be reflected on the LT target water temperature, a certain effect can be obtained for preventing the ignition crank angle from being excessively retarded.

However, the temperature environment of the internal combustion engine 10 does not change at all only by the change of the LT target water temperature. That is, in order for the temperature environment to change, it is necessary that the LT water temperature should reach the LT target water temperature after the change. Therefore, actually, the following phenomena tend to occur according to the method 1 or 2.

(1) Knocking occurs. (2) The ignition crank angle is retarded by the function of the KCS. Simultaneously, the LT target water temperature decreases. (3) Since the temperature environment does not change immediately, knocking occurs again. (4) The ignition crank angle is retarded again.

The LT target water temperature also decreases again. As a result, a large retard amount is set and further the LT target water temperature decreases to a value that is too low. (5) Since the ignition crank angle is largely retarded, the knocking is eliminated. Since the retard amount is large, the state is disadvantageous in terms of the fuel consumption. (6) As the LT water temperature approaches the too-low LT target water temperature, the ignition crank angle becomes excessively large with respect to a TK point. (7) Thereafter, the ignition crank angle is advanced up to a state in which the ignition crank angle traces the TK point. Meanwhile, the LT target water temperature is corrected to a temperature that is too high.

In this way, according to the method 1 or 2, excessive changes similar to hunting occur in both the ignition crank angle and the LT target water temperature due to a delay time required for the LT water temperature to reach the LT target water temperature. As a result, the following disadvantages occur in the internal combustion engine 10:

Temporary deterioration of the fuel consumption characteristics due to an excessive retard amount.

Excessive cooling of the internal combustion engine 10 due to a too-low LT target water temperature.

Deterioration of the fuel consumption characteristics attendant upon such excessive cooling.

As described above, the internal combustion engine 10 of this embodiment updates the KCS learned value based on the knocking occurrence state. In the stage after the update has been sufficiently repeated, the KCS learned value becomes a value correctly indicating the tendency of the occurrence of knocking. For example, even in a moment when the occurrence of knocking is not detected, if the KCS learned value is a large value, it can be determined that the internal combustion engine 10 is in a state where knocking tends to occur. On the other hand, even in a moment when the occurrence of knocking is detected, if the KCS learned value is a value that is not so large, it can be determined that the internal combustion engine 10 is in a state where knocking does not tend to occur so much.

The tendency of the occurrence of knocking gradually changes in the internal combustion engine 10 and does not largely change before and after one knocking. Likewise, the KCS learned value is gradually updated according to a knocking occurrence state. Therefore, if the KCS learned value is reflected on a LT target water temperature, the LT target water temperature continues to be corrected by a small value according to a knocking occurrence state and continues to steadily correspond to the tendency of the occurrence of knocking. If the change width of the LT target water temperature is so small as such, the actual LT water temperature does not largely deviate from the LT target water temperature. Therefore, if the KCS learned value is reflected on the LT target water temperature, the temperature environment of the internal combustion engine 10 can be made to continue to constantly correspond to the tendency of the occurrence of knocking. If the temperature environment of the internal combustion engine 10 can be made to continue to correspond to the tendency of the occurrence of knocking, either the deterioration of the fuel consumption due to excessive cooling or the deterioration of the fuel consumption due to an excessive retard of the ignition crank angle does not occur. Therefore, in this embodiment, the LT target water temperature is set based on not only the operating region of the internal combustion engine 10 but also the KCS learned value.

Figure 4:
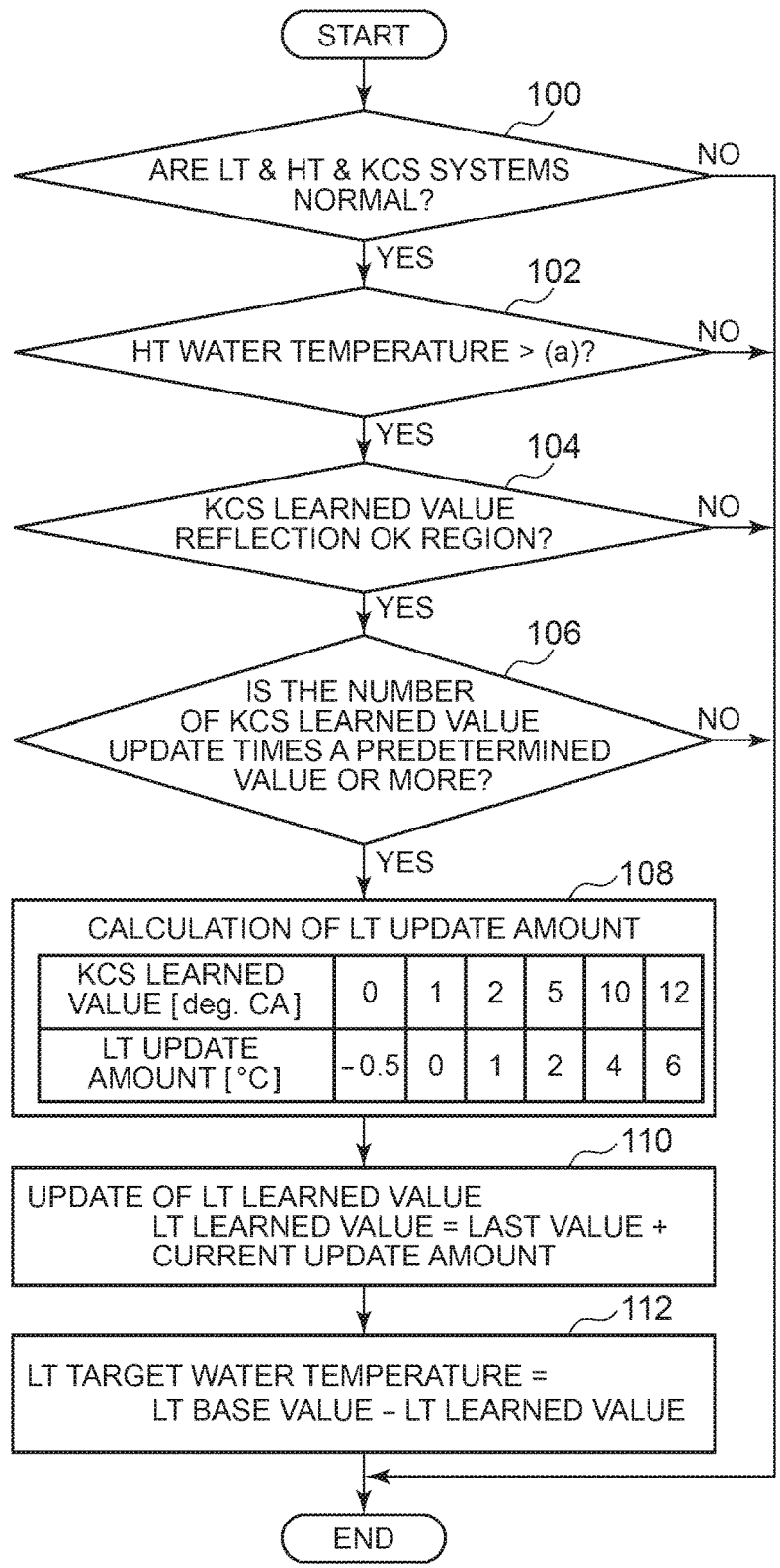
FIG. 4 is a flowchart of a routine implemented by an ECU in the first embodiment of the disclosure.

FIG. 4 is a flowchart of a routine implemented by the ECU 44 in this embodiment for realizing the function described above. In this embodiment, the ECU 44 stores a computer program for implementing the routine shown in FIG. 4 and includes hardware such as an interface, a memory, and a CPU for enabling such an implementation.

The routine shown in FIG. 4 is run per predetermined time of about 3 seconds. This predetermined time is a time taking into account a delay for the LT water temperature to follow a change after such a change of a LT target water temperature. Upon running the routine, it is first determined whether or not the LT system 30, the HT system 16, and the KCS are all normal (step 100). The system of this embodiment is equipped with failure determination functions respectively for the LT system 30, the HT system 16, and the KCS. Specifically, in step 100, it is determined whether a failure state is not determined for any of those systems.

If abnormality is detected for any of the LT system 30, the HT system 16, and the KCS, the current routine is ended immediately thereafter. On the other hand, if it is determined that all the systems are normal, then it is determined whether or not the HT water temperature is higher than (a)° C. (step 102). In the internal combustion engine 10, knocking occurs when the inside of the cylinder becomes a high temperature. Therefore, knocking does not occur until the internal combustion engine 10 is warmed up to some degree. (a)° C. is a temperature for determining whether or not warming-up has progressed to some degree, and is set to about 40° C. to 50° C. Therefore, if a determination of HT Water Temperature>(a) is denied at this step, it can be determined that it is not yet a state where knocking occurs so that it is not necessary to cool the peripheries of the intake ports by the LT system 30. In this case, the ECU 44 terminates the current routine immediately.

On the other hand, if it is determined at step 102 that HT Water Temperature>(a) is established, then it is determined whether or not an environment where a KCS learned value can be reflected on the control of the internal combustion engine 10 is established (step 104). Specifically, herein, it is determined whether or not all the following conditions are established. If any of conditions of•NE Range Lower Limit<Engine Rotational Speed NE<NE Range Upper Limit•KL Range Lower Limit Engine Load KL<KL Range Upper Limit•LT Range Lower Limit<LT Water Temperature<LT Range Upper Limit•Outside Air Temperature Range Lower Limit<Outside Air Temperature<Outside Air Temperature Range Upper Limit•No Failure of Other Associated Devices•No KCS Learning Prohibition Request from Other Modules is not established, it is determined that it is not a state where the KCS learned value can be reflected on the control of the internal combustion engine 10. In this case, the current routine is ended immediately.

If it is determined that the conditions described above are all established so that the environment capable of using the KCS learned value is established, then it is determined whether or not the number of KCS learned value update times has reached a predetermined value (step 106). This "predetermined value" is a value of 1 or more that is experimentally determined in advance as a determination value for determining whether or not the KCS learned value has become a value correctly indicating the tendency of the occurrence of knocking. If this determination is negative, it can be determined that it is still too early to reflect the KCS learned value on a LT target water temperature. In this case, the current routine is ended immediately.

On the other hand, if the determination at step 106 is affirmative, processes for reflecting the KCS learned value on the LT target water temperature are implemented. Specifically, first, a LT update amount is calculated based on the KCS learned value (step 108). The ECU 44 stores a map shown at step 108 in FIG. 4. In this map, the relationship between KCS learned values and LT update amounts is determined. According to the process at this step, as the KCS learned value increases, the LT update amount is set to a greater value.

After the process described above is completed, a LT learned value is updated according to the following formula (step 110). (LT learned value)=(last value)+(current update amount) . . . (Formula 1), wherein "last value" is a LT learned value calculated in the last routine and "current update amount" is a update amount calculated at step 108 in the current routine. According to the process described above, as the KCS learned value increases, the LT learned value is updated largely in an increase direction.

After the update of the LT learned value is completed, then, using the updated LT learned value, a LT target water temperature is set according to the following formula (step 112). (LT target water temperature)=(LT base value)−(LT learned value) . . . (Formula 2). As described above, the LT learned value is updated largely in the increase direction as the KCS learned value increases. Therefore, the LT target water temperature tends to be updated to a lower temperature with respect to the LT base value in the state where the occurrence of knocking is more likely.

The ECU 44 controls the E-W/P 32 the three-way valve 42, and the fan of the LT radiator 36 such that the LT water temperature reaches the LT target water temperature. Therefore, according to the processes described above, the LT water temperature becomes a lower temperature in the state where the occurrence of knocking is more likely, so that the temperature environment of the internal combustion engine 10 is changed in a direction in which knocking is difficult to occur.

Figure 5:
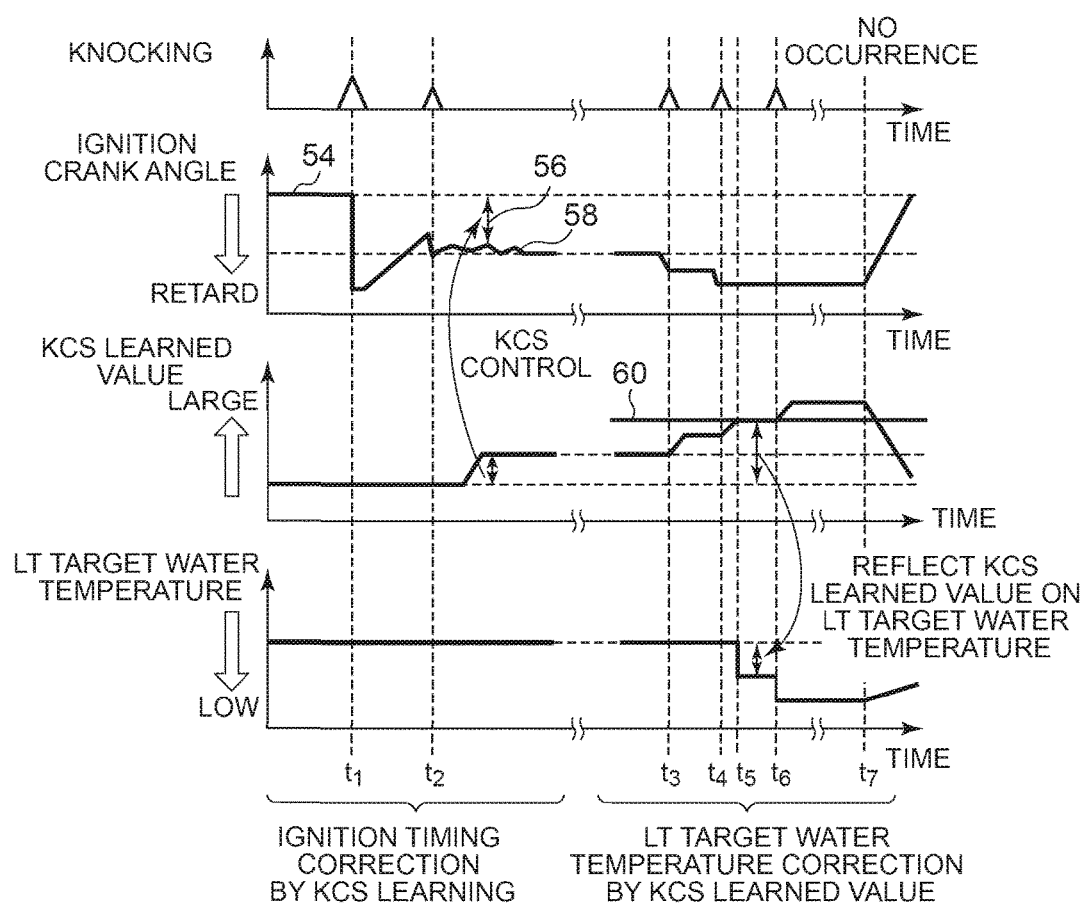
FIG. 5 is a timing chart showing one example of the operation of the first embodiment of the disclosure.

FIG. 5 is a timing chart for explaining one example of the operation of the internal combustion engine 10 that is realized by repeatedly implementing the routine described above. Triangular waveforms shown in the uppermost row of FIG. 5 each represent an occurrence of knocking and its intensity.

In the example shown in FIG. 5, knocking with high intensity occurs at time t1. In response thereto, the ignition crank angle is once largely retarded from a base value 54 and then is gradually returned in an advance direction. With the advance of the on crank angle, knocking with less intensity occurs at time t2. In response to such an occurrence, the ignition crank angle is retarded again in a stepped manner. From time t2 to time t3, substantial knocking does not occur and the ignition crank angle traces a TK point. Meanwhile, a KCS learned value 56 is set so as to correspond to a difference between the base value 54 and a final ignition crank angle 58.

In the example shown in FIG. 5, knocking occurs again at tune t3. In response thereto, the ignition crank angle is changed again in a retard direction in a stepped manner. In response to the state where knocking tends to occur, the KCS learned value is updated in an increase direction. At time t4, knocking occurs again and the ignition crank angle and the KCS learned value are further updated. As a result, at time t5, the number of KCS learned value update times has reached a predetermined value (see symbol 60) and the LT target water temperature is corrected in a low-temperature direction based on the KCS learned value.

At time t6, in response to an occurrence of knocking again, the KCS learned value is further updated in the increase direction. Further, based on the increased KCS learned value, the LT target water temperature is further corrected in the low-temperature direction. After time t7, since the occurrence of knocking is not detected continuously, the ignition crank angle is advanced toward the base value 54 and the KCS learned value is gradually updated to a smaller value. As a result, the LT target water temperature rises toward a normal set temperature after time t7.

As described above, the internal combustion engine 10 of this embodiment can efficiently prevent the occurrence of knocking by retarding the ignition crank angle and changing the temperature environment by the LT system 30. By updating the LT target water temperature based on the KCS learned value, the temperature environment of the internal combustion engine 10 can be properly changed without excessively reacting to individual knocking occurrences so as to correctly cancel the tendency of the occurrence of knocking. Therefore, according to this embodiment, the occurrence of knocking can be efficiently prevented without excessively retarding the ignition crank angle.

In this embodiment, the correction of the LT target water temperature is allowed only when the update of the KCS learned value has been sufficiently repeated. Through the sufficient updates, the KCS learned value has become a value properly indicating the tendency of the occurrence of knocking. Therefore, according to this embodiment, it can be prevented that the LT target water temperature is improperly updated in the stage where the tendency of the occurrence of knocking is not correctly reflected on the KCS learned value.

Further, in this embodiment, the LT target water temperature is updated per predetermined time of about 3 seconds. During the update interval of 3 seconds, the LT water temperature follows the LT target water temperature after the update to some degree and the KCS learned value also follows an environment after the update to some degree. Therefore, according to this embodiment, it is possible to effectively prevent the LT target water temperature from being excessively increased or decreased.

In the first embodiment described above, it is premised that the internal combustion engine 10 includes the HT system 16 and the LT system 30, but the application of the disclosure is not limited thereto. That is, the disclosure configured to set a target temperature of cooling water based on a KCS learned value can also be applied to a general internal combustion engine including a single cooling water passage.

In the first embodiment described above, the KCS learned value is reflected on the LT update amount, then the LT learned value is updated based on that LT update amount, and then the LT target water temperature is updated based on that LT learned value, but a method of reflecting the KCS learned value on the LT target water temperature is not limited thereto. For example, it may be configured that the KCS learned value is reflected directly on the LT learned value without using the LT update amount. Further, it may be configured that the KCS learned value is reflected directly on the LT target water temperature without using the LT learned value.

In the first embodiment described above, the correction of the LT target water temperature is allowed only when the number of KCS learned value update times has reached the predetermined value or more, but this condition is not essential in the disclosure. That is, it may be configured that the correction of the LT target water temperature based on the KCS learned value is carried out from the initial stage in which learning of the KCS learned value is started.

In the first embodiment described above, the LT system 30 includes the three-way valve 42 that can electrically change the state, but the disclosure is not limited thereto. The three-way valve 42 in the first embodiment can be replaced by a thermostat (T/S) similar to the one provided in the HT system 16.

In the first embodiment described above, the LT target water temperature is updated per 3 seconds (the routine shown in FIG. 4 is implemented per 3 seconds) in consideration of the delay for the LT water temperature to follow the LT target water temperature, but a method for the update is not limited thereto. For example, it may be configured that the routine shown in FIG. 4 is implemented at a period equal to an update period of the KCS learned value and that the average for a predetermined time (about 3 seconds) of LT target water temperatures obtained as a result thereof is supplied to the LT system 30 as a "command value."

In the first embodiment described above, the update of the LT learned value is allowed without providing the upper and lower limits (see step 110). An update method of the LT learned value is not limited thereto. It may be configured that the upper and lower limits are provided to a change amount allowed for the LT learned value for a preset time or in a preset travel distance. Further, it may be configured that this type of upper and lower limits is imposed on the LT target water temperature without imposing on the change amount of the LT learned value or in addition to imposing on the change amount of the LT learned value. By providing such limits, it is possible to prevent the LT target water temperature from improperly changing in a low-temperature direction or in a high-temperature direction.

In the first embodiment described above, a "cooling command supply system" is realized by the implementation of the routine shown in FIG. 4 by the ECU 44. Further, the cooling water temperature of the LT system 30 corresponds to a "cooling parameter," the LT target water temperature corresponds to a "target value" and a "command value," in and the LT system 30 corresponds to a "cooling system." Further, the cooling water of the LT system 30 corresponds to a "cooling medium," the HT system 16 corresponds to a "first cooling system," and the LT system 30 corresponds to a "second cooling system."

Next, a second embodiment of the disclosure will be described with reference to FIGS. 6 and 7. A system of this embodiment can be realized by causing the ECU 44 to implement a later-described routine shown in FIG. 7 instead of the routine shown in FIG. 4 in the configuration of the first embodiment.

Figure 6:
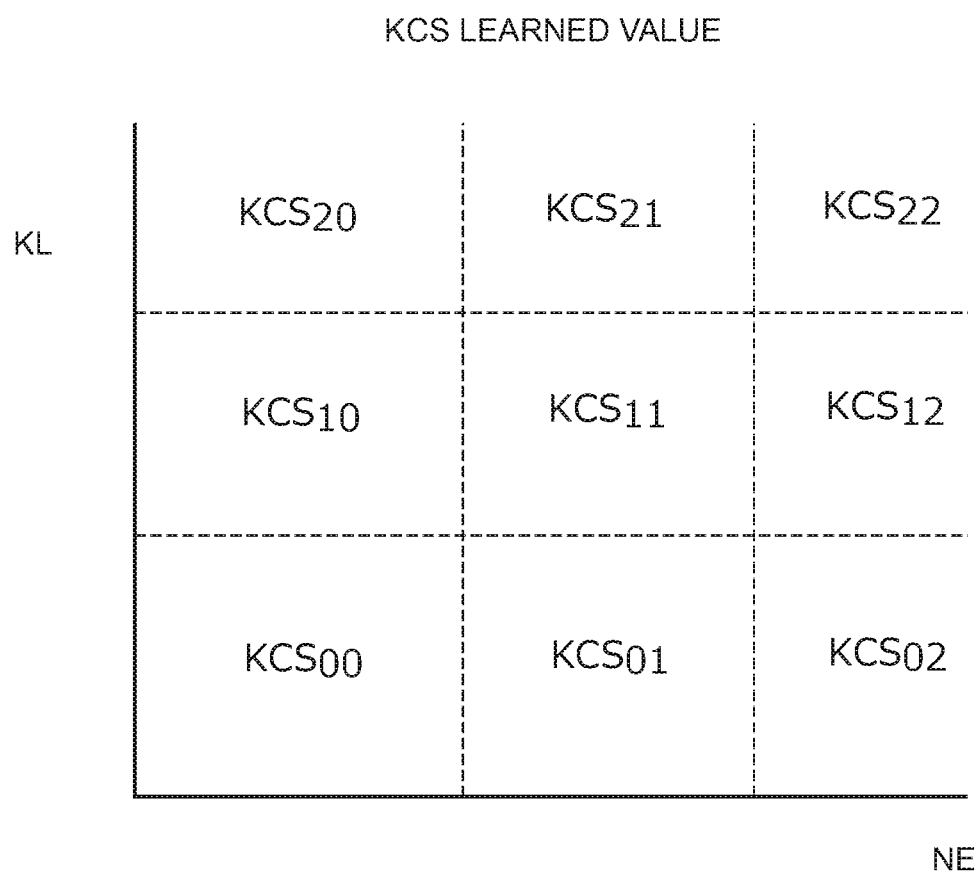
FIG. 6 is a diagram for explaining a state in which a KCS learned value is calculated for each of a plurality of divided operating regions in a second embodiment of the disclosure.

FIG. 6 is a diagram for explaining a method of KCS learning in this embodiment. As shown in FIG. 6, in this embodiment, the operating region of the internal combustion engine 10 is divided into a plurality of regions and a KCS learned value is learned per operating region. In the internal combustion engine 10, the tendency of the occurrence of knocking is not the same in all the operating regions. If the KCS learned value is learned per operating region as shown in FIG. 6, the KCS learned values each properly indicating the tendency of the occurrence of knocking can be prepared for all the operating regions.

Figure 7:
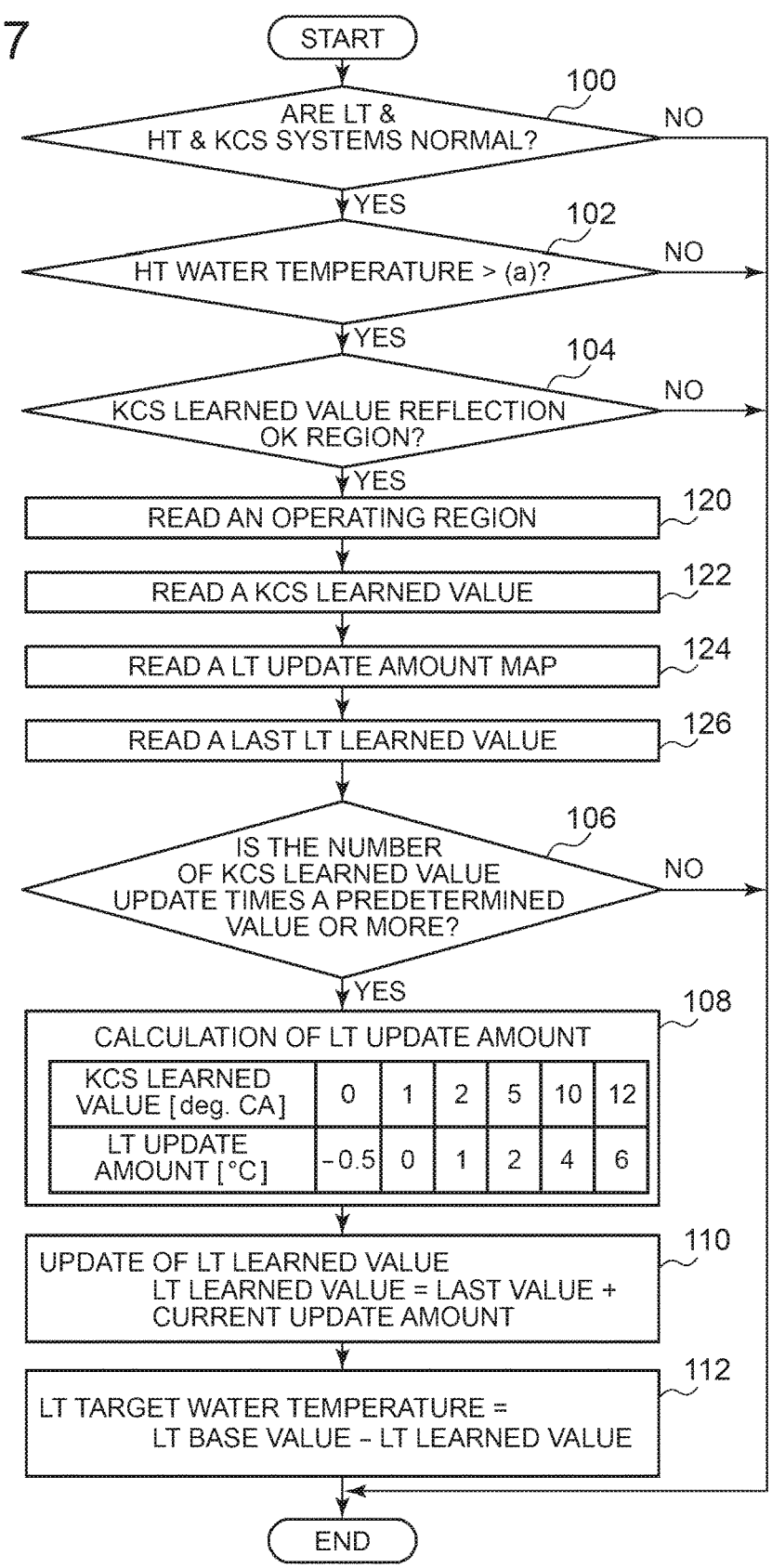
FIG. 7 is a flowchart of a routine implemented by an ECU in the second embodiment of the disclosure.

FIG. 7 is a flowchart of the routine implemented by the ECU 44 in this embodiment. In this embodiment, the ECU 44 stores a computer program for implementing the routine shown in FIG. 7 and includes hardware such as an interface, a memory, and a CPU for enabling such an implementation.

The routine shown in FIG. 7 is the same as the routine shown in FIG. 4 except that steps 120 to 126 are inserted between steps 104 and 106. In this embodiment, processes for dealing with learning of the KCS learned value per operating region are implemented at steps 120 to 126. The routine shown in FIG. 7 will be described centering on a portion unique to this embodiment.

The routine shown in FIG. 7 is run per predetermined time of about 3 seconds like the routine shown in FIG. 4. In this routine, subsequently to determinations of steps 100 to 104, an operating region of the internal combustion engine 10 is read (step 120). Specifically, based on an engine rotational speed NE and an accelerator opening degree Acc, it is determined to which of the operating regions divided as shown in FIG. 6 the current operating region belongs.

Then, a KCS learned value read process is implemented (step 122). As described above, in the system of this embodiment, the KCS learned value is learned per operating region shown in FIG. 6. At step 122, the KCS learned value learned for the current operating region is read.

Then, a LT update amount map is read (step 124). In this embodiment, the ECU 44 stores a map shown in a frame of step 108 per operating region. The map is experimentally determined per operating region as a rule suitable for calculating a LT update amount based on a KCS learned value. At step 124, the map corresponding to the current operating region is read from those maps.

Then, a last value of LT learning is read (step 126). In this embodiment, the ECU 44 stores a LT learned value per operating region (this operating region division may be the same as or different from the operating region division for KCS learned value). At step 126, the LT learned value learned last time for the current operating region is read.

Subsequently, using the KCS learned value, the LT update amount map, and the last LT learned value read through the processes of steps 122 to 126, processes of step 106 and subsequent steps are implemented. By the processes described above, it is possible to set a KCS learned value properly corresponding to the tendency of the occurrence of knocking in the current operating region and a LT target water temperature properly corresponding to that tendency of the occurrence of knocking. Therefore, according to the system of this embodiment, the output characteristics and the fuel consumption characteristics of the internal combustion engine 10 can be further improved compared to the case of the first embodiment.

The above-mentioned modifications of the first embodiment can all be used as modifications of the second embodiment.

In the second embodiment described above, a "cooling command supply system" is realized by the implementation of the routine shown in FIG. 7 by the ECU 44. Further, the LT update amount map shown in the frame of step 108 corresponds to an "update rule."

Next, a third embodiment of the disclosure will be described with reference to FIG. 8. A system of this embodiment can be realized by causing the ECU 44 to implement a routine shown in FIG. 8 instead of the routine shown in FIG. 4 in the configuration of the first embodiment.

In the first embodiment described above, the object of the correction based on the KCS learned value (i.e., a "command value") is the LT target water temperature. On the other hand, the system of this embodiment has a feature in that an object of correction based on a KCS learned value is, instead of a LT target water temperature, a Duty signal for the E-W/P 32 that is set based on the LT target water temperature.

That is, when the feedback control for causing the LT water temperature to reach the LT target water temperature is performed, the cooling capacity of the LT system 30 can be changed by changing the LT target water temperature. However, even if there is no change in the LT target water temperature, the cooling capacity of the LT system 30 can be changed by increasing or decreasing a Duty signal that is set based on the LT target water temperature.

Figure 8:
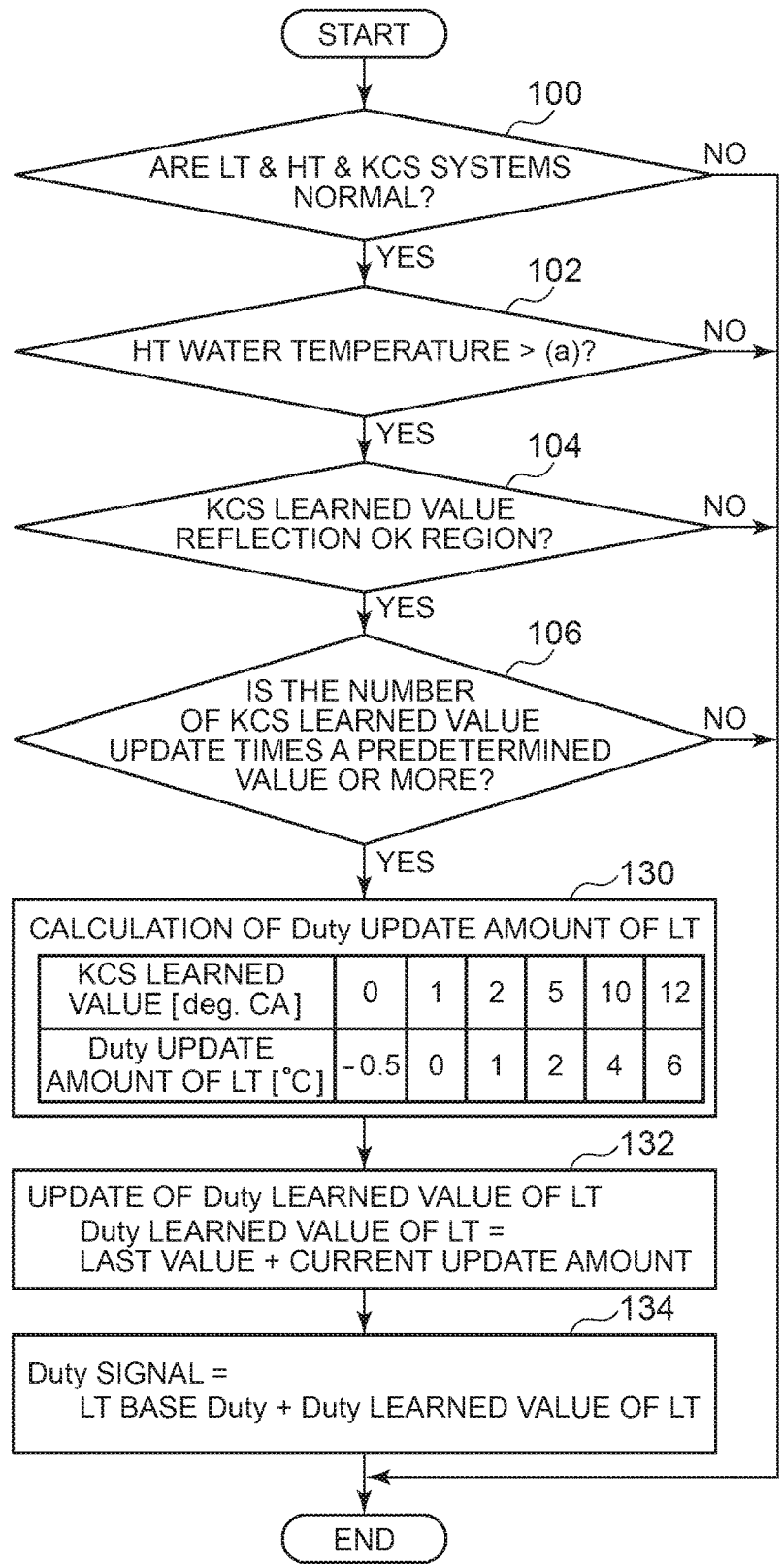
FIG. 8 is a flowchart of a routine implemented by an ECU in a third embodiment of the disclosure.

FIG. 8 is a flowchart for obtaining the same effect as in the case of the first embodiment by reflecting a KCS learned value on a Duty signal that is set based on a LT target water temperature. This routine is the same as the routine shown in FIG. 4 except that steps 108 to 112 are replaced by steps 130 to 134.

The routine shown in FIG. 8 is run per predetermined time of about 3 seconds like the routine shown in FIG. 4. In this routine, subsequently to determinations of steps 100 to 106, a Duty update amount is calculated based on a KCS learned value (step 130). In this embodiment, the ECU 44 stores a map for converting a KCS learned value to a Duty update amount, as shown in a frame of step 130. This map is set such that as the KCS learned value increases, the Duty update amount becomes a greater value.

After the process described above is completed, a Duty learned value is updated according to the following formula (step 132). (Duty learned value) (last value)+(current update amount) . . . (Formula 3), wherein "last value" is a value of a Duty signal calculated in the last routine and "current update amount" is a Duty update amount calculated at step 130 in the current routine. According to the process described above, as the KCS learned value increases, the Duty learned value is updated largely in an increase direction.

After the Duty learned value is updated, then, using the updated Duty learned value, a Duty signal for the LT system 30 is calculated according to the following formula (step 134). (Duty signal)=(LT base Duty)+(Duty learned value) . . . (Formula 4), wherein "LT base Duty" is a duty cycle calculated by the ECU 44 to be supplied to the E-W/P 32 for realizing a LT target water temperature (not corrected by the KCS learned value).

As described above, the Duty learned value is updated largely in the increase direction as the KCS learned value increases. Therefore, according to the formula 4, the Duty signal for the E-W/P 32 tends to be updated to a greater value with respect to the LT base Duty in the state where the occurrence of knocking is more likely. As the Duty signal becomes a greater value, the discharge amount of the E-W/P 32 increases so that the cooling capacity of the LT system 30 is enhanced. As a result, according to the processes described above, as the KCS learned value increases, the LT water temperature decreases to a lower temperature compared to the normal LT target water temperature, so that the temperature environment about knocking can be improved. Therefore, according to the system of this embodiment, as in the case of the first embodiment, the occurrence of knocking can be efficiently prevented by both the retard of the ignition crank angle and the temperature of the LT system 30.

In the third embodiment described above, the object of the correction based on the KCS learned value is limited to the Duty signal, but its object is not limited thereto. That is, the cooling capacity of the LT system 30 can also be enhanced by a state of the three-way valve 42 or a state of the fan of the LT radiator 36. Therefore, the correction based on the KCS learned value may be applied to an opening degree of the three-way valve 42 or a drive signal of the radiator fan.

The above-mentioned modifications of the first embodiment can all be used as modifications of the third embodiment. The method of the second embodiment that calculates the KCS learned value per operating region and calculates the "command value" per operating region can be combined with the method that applies the correction based on the KCS learned value to the Duty signal.

In the third embodiment described above, a "cooling command supply system" is realized by the implementation of the routine shown in FIG. 8 by the ECU 44. Further, the discharge amount of the E-W/P 32 corresponds to a "cooling parameter" and the Duty signal for the E-W/P 32 corresponds to a "target value" and a "command value." Further, the cooling water of the LT system 30 corresponds to a "cooling medium."

Next, a fourth embodiment of the disclosure will be described with reference to FIGS. 9 and 10. A system of this embodiment can be realized by causing the ECU 44 to implement a later-described routine shown in FIG. 10 in addition to the routine shown in FIG. 4, FIG. 7, or FIG. 8 in the configuration of the first embodiment.

In the internal combustion engine 10 shown in each of the first to third embodiments, there are cases where the LT system 30 reaches a cooling limit due to the conditions on hardware or due to the conditions about stable combustion of fuel.

For example, the LT system 30 reaches "cooling limit on hardware" when all the following conditions are established. (1) The E-W/P 32 is driven by a 100% Duty signal. (2) The three-way valve 42 is in a state in which all the cooling water is circulated through the LT radiator 36. (3) The fan of the LT radiator 36 is rotating at the upper-limit speed.

Further, in the internal combustion engine 10, there are cases where when the peripheries of the intake ports are at excessively low temperatures, pre-ignition occurs. Therefore, when the LT water temperature is lowered to a temperature that can cause the occurrence of pre-ignition, the LT system 30 reaches "cooling limit on stable combustion."

In the first to third embodiments, by controlling the HT system 16 independently of the LT system 30, the temperature environment about knocking can be improved without causing an increase in the mechanical loss of the internal combustion engine 10. However, in such a system, in the case where the LT system 30 reaches the cooling limit, but still the occurrence of knocking is not eliminated, a situation can occur in which there is no alternative but to excessively retard the ignition crank angle in order to prevent the occurrence of knocking.

Figure 9:
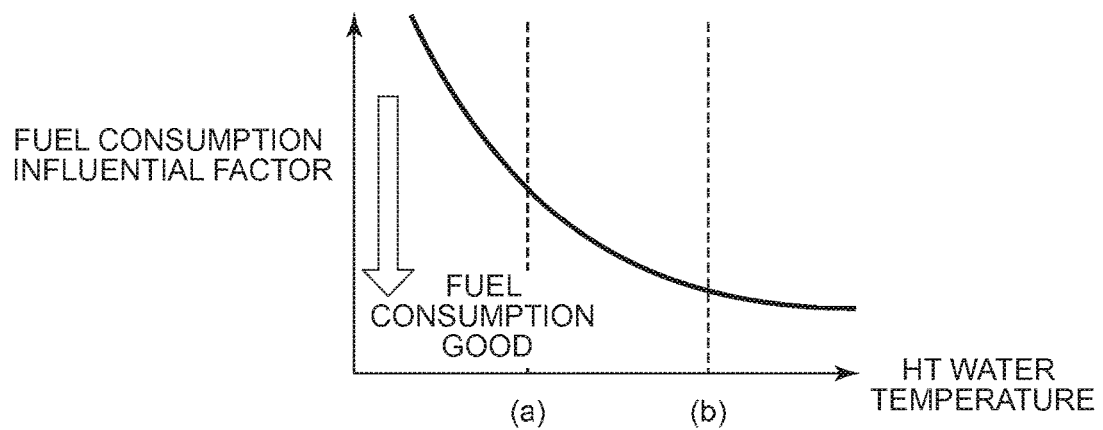
FIG. 9 is a diagram for explaining a region in which a correction is applied to a target temperature of a high temperature (HT) system in a fourth embodiment of the disclosure.

FIG. 9 shows the relationship between the magnitude of factors that affect the fuel consumption characteristics of the internal combustion engine 10, such as the mechanical friction and the cooling loss, on the ordinate axis, and the HT water temperature, on the abscissa. The internal combustion engine 10 exhibits better fuel consumption characteristics as the above-mentioned factors decrease. The factors such as the mechanical friction and the cooling loss decrease as warming-up of the internal combustion engine 10 progresses. Therefore, as shown in FIG. 9, the fuel consumption of the internal combustion engine 10 becomes better as the HT water temperature increases.

(b)° C. shown in FIG. 9 is a temperature at which the decreasing rates of the factors that affect the fuel consumption substantially converge in the rise process of the HT water temperature. In other words, it is a temperature at which the decreasing rates of the factors with respect to the rise of the HT water temperature decrease to a predetermined determination value. The normal target temperature of the HT water temperature (set temperature of the T/S 28) is about 85° C. to 90° C. (b)° C. is lower than that and is about 80° C.

According to the characteristics shown in FIG. 9, it is seen that the fuel consumption characteristics of the internal combustion engine 10 are not affected so much by the rise of the HT water temperature in a region higher than (b)° C. On the other hand, in a region where the HT water temperature is higher than 80° C., the amount of heat transmitted from the cylinder block 12 to the cylinder head 14 also affects the peripheral temperature of the intake ports. Therefore, in terms of improving the temperature environment about knocking, it is beneficial to decrease the HT water temperature in addition to cooling by the LT system 30.

Therefore, in this embodiment, in the case where the LT system 30 has reached the cooling limit, but still the occurrence of knocking is not eliminated, the HT water temperature is corrected to a temperature lower than the normal target temperature in a range not lower than (b)° C.

(a)° C. shown in FIG. 9 is a temperature that is used for the determination at step 102 in the first to third embodiments. As described above, the region in which the HT water temperature is not higher than (a)° C. is a region in which knocking does not occur in the internal combustion engine 10.

In this embodiment, the ECU 44 implements the routine shown in FIG. 4, FIG. 7, or FIG. 8 in order to control the LT water temperature. In addition thereto, in this embodiment, the ECU 44 implements the routine shown in FIG. 10 in order to control the HT water temperature. The routine shown in FIG. 10 is run per predetermined time of about 3 seconds like the routine shown in FIG. 4 or the like. Among steps shown in FIG. 10, those steps that perform the same processes as the steps shown in FIG. 4 or the like are assigned the same symbols, thereby omitting overlapping explanation thereof.

In the routine shown in FIG. 10, after a normality determination of the system is made at step 100, it is determined whether or not the LT system 30 has reached a cooling limit (step 140). Herein, specifically, the following determination is made.•Whether or not the LT system 30 has reached "cooling limit on hardware" described above. •Whether or not the LT system 30 has reached "cooling limit on stable combustion" described above.

If it is determined by the process described above that the LT system 30 has not reached either of the cooling limits, it can be determined that there is room for improvement of the temperature environment by the LT system 30. In this case, the current routine is ended immediately. On the other hand, if it is determined that the LT system 30 has reached either one of the cooling limits, then it is determined whether or not the HT water temperature is higher than (b)° C. (step 142).

If it is determined at step 142 that HT Water Temperature> (b)° C. is not established, it can be determined that if the HT water temperature is decreased, the fuel consumption characteristics of the internal combustion engine 10 are largely deteriorated. In this case, the HT water temperature is not decreased and the current routine is ended.

On the other hand, if HT Water Temperature>(b)° C. is established, it can be determined that it is advantageous to jointly use a decrease in the HT water temperature as a method of knocking prevention. Therefore, if the determination at step 142 is affirmative, processes for decreasing a HT target water temperature are implemented via determinations at steps 104 and 106.

In this embodiment, as in the case of the LT target water temperature, the HT target water temperature is also decreased according to the tendency of the occurrence of knocking. Specifically, the ECU 44 corrects the HT target water temperature based on a KCS learned value (steps 144 to 148). The processes at steps 144 to 148 are the same as the processes at steps 108 to 112 described above except that "LT" is replaced by "HT." However, "HT Base Value" at step 148 is a normal target temperature of the HT system 16.

According to the processes described above, as the KCS learned value increases, i.e., when the internal combustion engine 10 is in a state where the occurrence of knocking is more likely, the HT target water temperature tends to be updated to a lower temperature with respect to the HT base value. The HT system 16 causes the HT water temperature to reach the HT target water temperature. Therefore, according to the processes described above, in the state where the occurrence of knocking is more likely, the HT water temperature becomes a lower temperature so that the temperature environment of the internal combustion engine 10 is changed in a direction in which knocking is difficult to occur.

FIG. 11 is a timing chart for explaining one example of the operation of the internal combustion engine 10 that is realized by repeatedly implementing the routine described above. In FIG. 11, since waveforms shown in the column of "Knocking" in the uppermost row, the column of "Ignition Crank Angle" in the second row, the column of "KCS Learned Value" in the third row, and the column of "LT Target Water Temperature" in the fourth row are the same as those in the timing chart shown in FIG. 5, overlapping explanation thereof will be omitted.

The lowermost row in FIG. 11 shows the column of "HT Target Water Temperature." In this column, specifically, a HT target water temperature 62 (solid line) and a HT water temperature 64 (broken line) are shown. In the example shown in FIG. 11, the HT water temperature 64 exceeds a first threshold value (a)° C. in the process from time t4 to time t5. As a result, at time t5, the process of reflecting the KCS learned value on the LT target water temperature is started.

In FIG. 11, the HT water temperature 64 exceeds a second threshold value (b)° C. in the process from time t5 to time t6. Then, at time t6, the LT target water temperature is subjected to a second correction in a low-temperature direction in response to an occurrence of knocking. Herein, it is assumed that the LT system 30 has reached the cooling limit by the second correction. That is, in the example shown in FIG. 11, it is assumed that the conditions that the LT system 30 has reached the cooling limit and that the HT water temperature is higher than (b)° C. are established at time t6.

Therefore, in the example shown in FIG. 11, after time t6, the HT target water temperature is decreased and, following it, the HT water temperature decreases. In this embodiment, the HT target water temperature can be decreased until the HT water temperature decreases to (b)° C. The timing chart shown in FIG. 11 shows the operation in which the correction to decrease the HT target water temperature is carried out to the maximum degree and, as a result, the HT water temperature decreases to (b)° C.

After time t7, if it is determined that the occurrence of knocking is not detected continuously, the ignition crank angle is advanced toward the base value 54 and the KCS learned value is gradually updated to a smaller value. As a result, both the LT target water temperature and the HT target water temperature 62 rise toward the normal set temperatures after time t7.

As described above, when the LT system 30 has reached the cooling limit, the internal combustion engine 10 of this embodiment can further improve the temperature environment by decreasing the HT water temperature. Therefore, according to the system of this embodiment, it is possible to further suppress the retard of the ignition crank angle compared to the case of the first to third embodiments and to further improve the fuel consumption characteristics of the internal combustion engine 10 compared to the case of the first to third embodiments.

In the fourth embodiment described above, the HT target water temperature is decreased only when the HT water temperature is higher than (b)° C., but this condition is not essential in the disclosure. It may be configured that when a decrease in the HT water temperature is advantageous to the retard of the ignition crank angle, the HT target water temperature is decreased in the state where the HT water temperature is lower than (b)° C.

In the fourth embodiment described above, the HT target water temperature is decreased based on the KCS learned value, but the disclosure is not limited thereto. That is, it may be configured that the HT target water temperature is decreased, for example, by a fixed amount regardless of the KCS learned value.

In the fourth embodiment described above, the KCS learned value is reflected on the HT update amount, then the HT learned value is updated based on that HT update amount, and then the HT target water temperature is updated based on that HT learned value, but a method of reflecting the KCS learned value on the HT target water temperature is not limited thereto. For example, it may be configured that the KCS learned value is reflected directly on the HT learned value without using the HT update amount. Further, it may be configured that the KCS learned value is reflected directly on the HT target water temperature without using the HT learned value.

In the fourth embodiment described above, the correction of the HT target water temperature is allowed only when the number of KCS learned value update times has reached the predetermined value or more, but this condition is not essential in the disclosure. That is, it may be configured that the correction of the HT target water temperature based on the KCS learned value is carried out from the initial stage in which learning of the KCS learned value is started.

In the fourth embodiment described above, the routine shown in FIG. 10 is implemented per predetermined time of about 3 seconds, but a method for the update is not limited thereto. For example, it may be configured that the routine shown in FIG. 10 is implemented at a period equal to an update period of the KCS learned value and that the average for a predetermined time (about 3 seconds) of HT target water temperatures obtained as a result thereof is supplied as a target temperature to the HT system 16.

In the fourth embodiment described above, the update of the HT learned value is allowed without providing the upper and lower limits (see step 146). An update method of the HT learned value is not limited thereto. It may be configured that the upper and lower limits are provided to a change amount allowed for the HT learned value for a preset time or in a preset travel distance. Further, it may be configured that this type of upper and lower limits is imposed on the HT target water temperature without imposing on the change amount of the HT learned value or in addition to imposing on the change amount of the HT learned value. By providing such limits, it is possible to prevent the HT target water temperature from improperly changing in a low-temperature direction or in a high-temperature direction.

In the fourth embodiment described above, the HT target water temperature corresponds to a "target temperature." Further, the second threshold value (b)° C. corresponds to a "determination temperature."

What is claimed is:

1. A control device for an internal combustion engine, comprising:
   a knock control system configured to calculate a knock control system (KCS) learned value according to presence or absence of knocking of the internal combustion engine such that the KCS learned value is updated in an increase direction when the knocking occurs and is updated in a decrease direction when the knocking does not occur, the knock control system configured to calculate an ignition crank angle based on the KCS learned value, the knock control system configured to ignite a spark plug of the internal combustion engine at an ignition crank angle obtained by retarding the ignition crank angle in response to an occurrence of the knocking;
   a cooling system configured to cool the internal combustion engine; and
   an electronic control unit configured to supply a command value corresponding to a target value of a cooling parameter to the cooling system such that the cooling system performs cooling of the internal combustion engine according to the command value, the electronic control unit configured to correct the command value based on the KCS learned value such that as the KCS learned value increases, a correction amount for correcting the command value increases in correction amount in a direction in which a cooling capacity of the cooling system increases, wherein
   the internal combustion engine includes a first cooling system that mainly cools a cylinder block of the internal combustion engine and a second cooling system that mainly cools a periphery of an intake port compared to the first cooling system,
   the first cooling system and the second cooling system respectively include cooling medium flow passages independent of each other, and
   the electronic control unit is configured to supply the command value to the second cooling system.

2. The control device for the internal combustion engine according to claim 1, wherein
   the electronic control unit is configured not to correct the command value when a number of times of updating the KCS learned value according to the presence or absence of the knocking is less than a predetermined value, and is configured to correct the command value when the number of times of updating the KCS learned value is the predetermined value or more.

3. The control device for the internal combustion engine according to claim 1, wherein
   the electronic control unit is configured to update a cooling parameter learned value based on the KCS learned value such that as the KCS learned value increases, an update amount for updating the cooling parameter learned value increases in update amount in a direction in which the cooling capacity of the cooling system increases, and the electronic control unit is configured to determine the target value based on a base value of the cooling parameter and the cooling parameter learned value.

4. The control device for the internal combustion engine according to claim 3, wherein
   the electronic control unit is configured to calculate the update amount of the cooling parameter learned value based on the KCS learned value and to update the cooling parameter learned value with the update amount such that as the KCS learned value increases, the update amount increases in update amount in the direction in which the cooling capacity of the cooling system increases.

5. The control device for the internal combustion engine according to claim 3, wherein
the knock control system is configured to calculate the KCS learned value for each of a plurality of operating regions of the internal combustion engine, and
the electronic control unit is configured to store an update rule for each of the operating regions for updating the cooling parameter learned value for each of the operating regions based on the KCS learned value for each of the operating regions, and the electronic control unit is configured to update the cooling parameter learned value in every individual operating region according to the update rule for each of the operating regions.

6. The control device for the internal combustion engine according to claim 1, wherein
the cooling parameter is a cooling medium temperature,
the electronic control unit is configured to supply as the command value a target value of the cooling medium temperature to the cooling system such that as the KCS learned value increases, a correction amount of the target value of the cooling medium temperature increases in a low-temperature direction, and
the cooling system is configured to control a cooling medium of the cooling system so as to realize the target value of the cooling medium temperature.

7. The control device for the internal combustion engine according to claim 1, wherein
the cooling system includes an electric water pump capable of changing a discharge amount of a cooling medium,
the cooling parameter is the discharge amount of the electric water pump, and
the electronic control unit is configured to supply as the command value a target value of the discharge amount to the cooling system such that as the KCS learned value increases, a correction amount of the target value of the discharge amount increases in an amount increase direction.

8. The control device for the internal combustion engine according to claim 1, wherein
the electronic control unit is configured to supply a target temperature to the first cooling system,
the first cooling system is configured to control a cooling medium of the first cooling system so as to realize the target temperature of the first cooling system, and
the electronic control unit is configured to decrease the target temperature of the first cooling system when the second cooling system has reached a limit of cooling.

9. The control device for the internal combustion engine according to claim 8, wherein
the electronic control unit is configured to allow a decrease in the target temperature of the first cooling system only when a cooling medium temperature of the first cooling system is higher than a determination temperature.

10. The control device for the internal combustion engine according to claim 8, wherein
the electronic control unit is configured to decrease the target temperature of the first cooling system based on the KCS learned value.

11. A method for controlling an internal combustion engine, comprising:
calculating a knock control system (KCS) learned value according to presence or absence of knocking of the internal combustion engine such that the KCS learned value is updated in an increase direction when the knocking occurs and is updated in a decrease direction when the knocking does not occur;
calculating an ignition crank angle based on the KCS learned value,
igniting a spark plug of the internal combustion engine at an ignition crank angle obtained by retarding the ignition crank angle in response to an occurrence of the knocking;
supplying a command value corresponding to a target value of a cooling parameter to a cooling system of the internal combustion engine such that the cooling system performs cooling of the internal combustion engine according to the command value; and
correcting the command value based on the KCS learned value such that as the KCS learned value increases, a correction amount for correcting the command value increases in correction amount in a direction in which a cooling capacity of the cooling system increases wherein
the internal combustion engine includes a first cooling system that mainly cools a cylinder block of the internal combustion engine and a second cooling system that mainly cools a periphery of an intake port compared to the first cooling system,
the first cooling system and the second cooling system respectively include cooling medium flow passages independent of each other, and
the electronic control unit is configured to supply the command value to the second cooling system.

* * * * *